United States Patent
Lior

(10) Patent No.: US 11,846,202 B2
(45) Date of Patent: Dec. 19, 2023

(54) COOLING METHOD FOR A HIGH-TEMPERATURE RADIAL GAS TURBINE ENGINE

(71) Applicant: Turbogen Ltd., Ramat Gan (IL)

(72) Inventor: David Lior, Herzliya (IL)

(73) Assignee: Turbogen Ltd., Petach Tivka (IL)

( * ) Notice: Subject to any disclaimer, the term of this patent is extended or adjusted under 35 U.S.C. 154(b) by 208 days.

(21) Appl. No.: 17/433,251

(22) PCT Filed: Feb. 24, 2020

(86) PCT No.: PCT/IB2020/051541
§ 371 (c)(1),
(2) Date: Aug. 24, 2021

(87) PCT Pub. No.: WO2020/170227
PCT Pub. Date: Aug. 27, 2020

(65) Prior Publication Data
US 2022/0136458 A1    May 5, 2022

Related U.S. Application Data

(60) Provisional application No. 62/809,649, filed on Feb. 24, 2019.

(51) Int. Cl.
*F01D 5/04* (2006.01)
*F02K 3/02* (2006.01)
*F04D 29/58* (2006.01)

(52) U.S. Cl.
CPC ............. *F01D 5/046* (2013.01); *F02K 3/02* (2013.01); *F04D 29/584* (2013.01)

(58) Field of Classification Search
CPC .................................................. F01D 5/046
See application file for complete search history.

(56) References Cited

U.S. PATENT DOCUMENTS

| 4,800,717 A | * | 1/1989 | Rodgers | ............. F01D 5/046 415/115 |
| 2019/0010870 A1 | * | 1/2019 | Miller | ............. F02C 9/18 |

OTHER PUBLICATIONS

D. S. Monson et al. "High-Temperature Radial Turbine Demonstration," DTIC AD-A084120, Apr. 1980.
P.H. Snyder et al., "The Design of an Air-Cooled Metallic High Temperature Radial Turbine", Journal of Propulsion and Power, vol. 26, No. 3, May-Jun. 1990.
P. H. Snyder, "Cooled High-Temperature Radial Turbine Program, II-Final Report," DTIC AD-A254827, May 1992.

\* cited by examiner

*Primary Examiner* — Courtney D Heinle
*Assistant Examiner* — John S Hunter, Jr.
(74) *Attorney, Agent, or Firm* — Mark M. Friedman

(57) ABSTRACT

A method for cooling a high-temperature radial gas turbine engine increases turbine thermal efficiency and/or extends turbine operational lifetime. A bleed flow path enables cooling air to flow from a compressor outlet and along surfaces of the gas turbine rotors. The amount of cooling increases in proportion to a bleed fraction, which is defined as the ratio of mass flow in the bleed flow path to total mass flow in the compressor outlet. The heated air in the bleed flow path is mixed with the main mass flow into the turbine engine, so as to restore mass flow into the turbine, while maintaining a high turbine operating temperature and thermal efficiency. The thermal efficiency of a recuperator also increases in proportion to the bleed fraction.

6 Claims, 4 Drawing Sheets

COOLING METHOD FOR A HIGH-TEMPERATURE RADIAL GAS TURBINE ENGINE

CROSS-REFERENCE TO RELATED APPLICATIONS

This application claims the benefit of U.S. provisional patent application Ser. No. 62/809,649, filed Feb. 24, 2019, by the present inventors which is incorporated by reference in its entirety herein.

FIELD OF THE INVENTION

The invention relates to a method for cooling high-temperature radial gas turbines.

BACKGROUND

Increasing the gas inlet temperature in a radial turbine engine generally increases its efficiency but reduces its lifetime. With the advent of advanced rotor materials, it is possible to operate at gas temperatures as high as 1275° K, provided that stress and temperature of the rotor blades are carefully controlled. To achieve a long lifetime, mechanical stresses must be reduced by proper design of the filleting geometry of the blade surface, and rotor temperatures must be reduced by cooling. In the case of radial turbines, the cooling design is more complicated than that of axial turbines, because of a non-straight turbine blade geometry.

D. S. Monson et al., "High-Temperature Radial Turbine Demonstration," DTIC AD-A084120, April 1980 presents manufacturing techniques for casting a rotor assembly for a high-temperature radial gas turbine, fabricated using Mar-M-247 metal alloy.

P. H. Snyder et al., "The Design of an Air-Cooled Metallic High Temperature Radial Turbine", Journal of Propulsion and Power, Vol. 26, No. 3, May-June 1990, pages 283-288, presents a cooling method for a radial turbine in which cooling air flows through a hollow rotor blade, in a manner analogous to the cooling of axial turbine blades. Further details are provided in P. H. Snyder, "Cooled High-Temperature Radial Turbine Program, II-Final Report," DTIC AD-A254827, May, 1992.

The use of a hollow blade has not been applied commercially because of its high cost, the need for a thick blade in order to accommodate internal cooling passages, and the complexity of fluid flow inside the internal cooling passages. Another disadvantage of a hollow blade is the need for pressurized cooling air, which incurs a loss in the energy efficiency of a single-stage radial gas turbine.

SUMMARY OF THE INVENTION

A method is disclosed for cooling the rotor blades of a high-temperature radial gas turbine, which increases turbine thermal efficiency and/or extends turbine operational lifetime.

The disclosed cooling method directs a fluid (e.g. air), which is bled from a compressor outlet, to the roots of the rotor blades. This cools the blade roots by an amount which increases in proportion to the mass flow rate of the bleed flow. In the process of cooling the rotors, the bled air is heated and then mixed with the main air flowing into the turbine, so as to restore mass flow into the turbine, while maintaining a high turbine operating temperature and thermal efficiency. In one embodiment of the invention, the effect of the bleed air cooling is an increase in lifetime of the rotor blades in proportion to the mass flow rate of the bleed flow, for a fixed turbine thermal efficiency. In another embodiment of the invention, the effect of the cooling bleed flow is a significant increase in turbine thermal efficiency in proportion to the mass flow rate of the bleed flow, for a fixed operational lifetime of the rotor blades.

An additional advantage of the disclosed invention is that, in a recuperated gas turbine, the bled air taken from the compressor outlet improves the thermal effectiveness of a recuperator heat exchanger, by decreasing hot-to-cold flow ratios inside the heat exchanger. The improvement in recuperator effectiveness may be applied to both radial and axial recuperated gas turbines.

In the invention, a method for cooling hot components of a high-temperature radial gas turbine engine includes providing a radial gas turbine engine with a compressor outlet and at least one rotor which has a rotor disc and a rotor blade, and providing a bleed flow path in which a fluid passes from the compressor outlet and flows along surfaces of the rotor disc and rotor blade. The ratio of a mass flow in the bleed flow path to a mass flow in the compressor outlet is equal to a bleed fraction which is greater than or equal to zero and less than or equal to one.

According to one feature of the method of the invention, the rotor blade includes a root of the rotor blade.

According to another feature of the method of the invention, the mass flow in the bleed flow path is mixed with a main mass flow into the radial gas turbine engine.

According to another feature of the method of the invention, an operational lifetime of the radial gas turbine engine increases in proportion to the bleed fraction, for a fixed engine thermal efficiency.

According to yet another feature of the method of the invention, a thermal efficiency of the radial gas turbine engine increases in proportion to the bleed fraction, for a fixed engine operational lifetime.

According to still another feature of the method of the invention, the method also provides a recuperator heat exchanger. The thermal effectiveness of the recuperator heat exchanger increases in proportion to the bleed fraction.

According to a feature of the method of the invention, the bleed fraction is at least 3 percent.

BRIEF DESCRIPTION OF THE DRAWINGS

The invention is described herein, by way of example only, with reference to the accompanying drawings, wherein.

DETAILED DESCRIPTION

Figure 1:
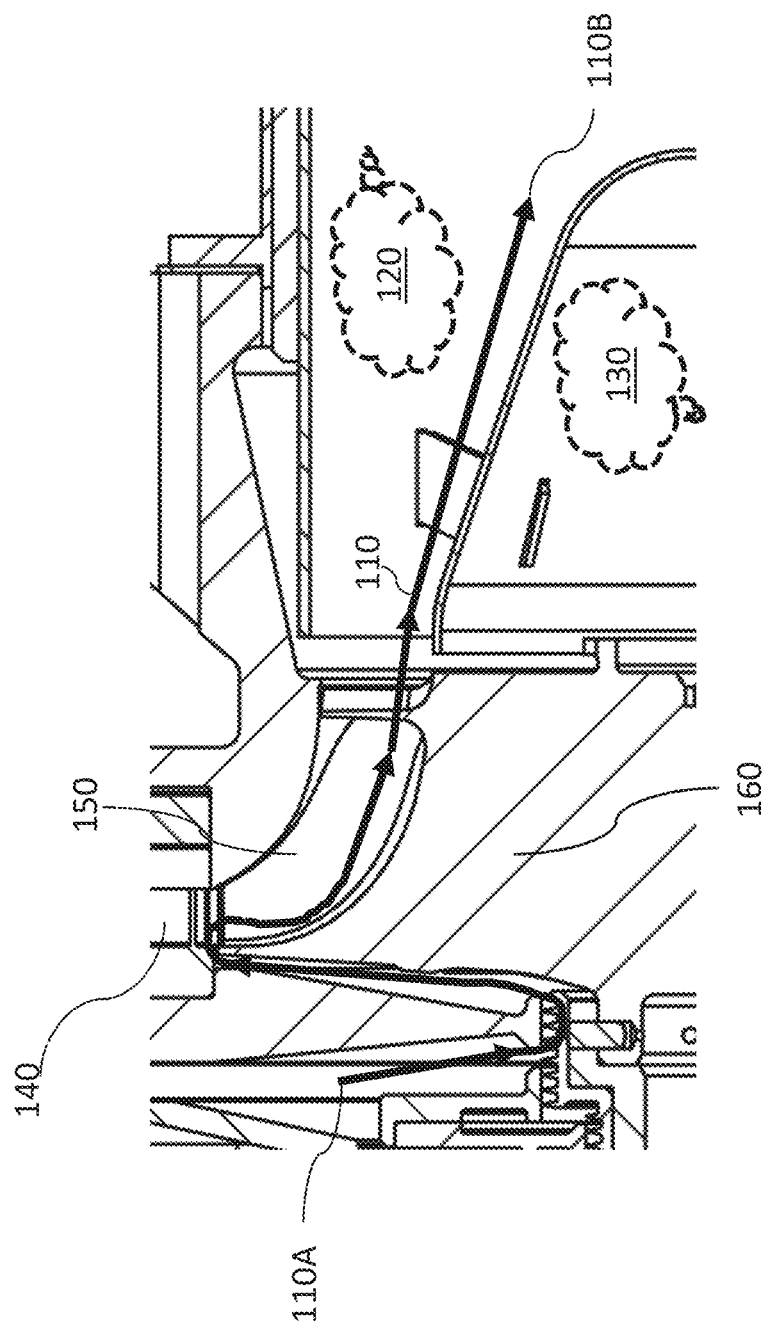
FIG. 1: An exemplary cross-sectional drawing of a bleed flow path for cooling a high temperature radial turbine, according to the principles of the invention.
Figure 2B:
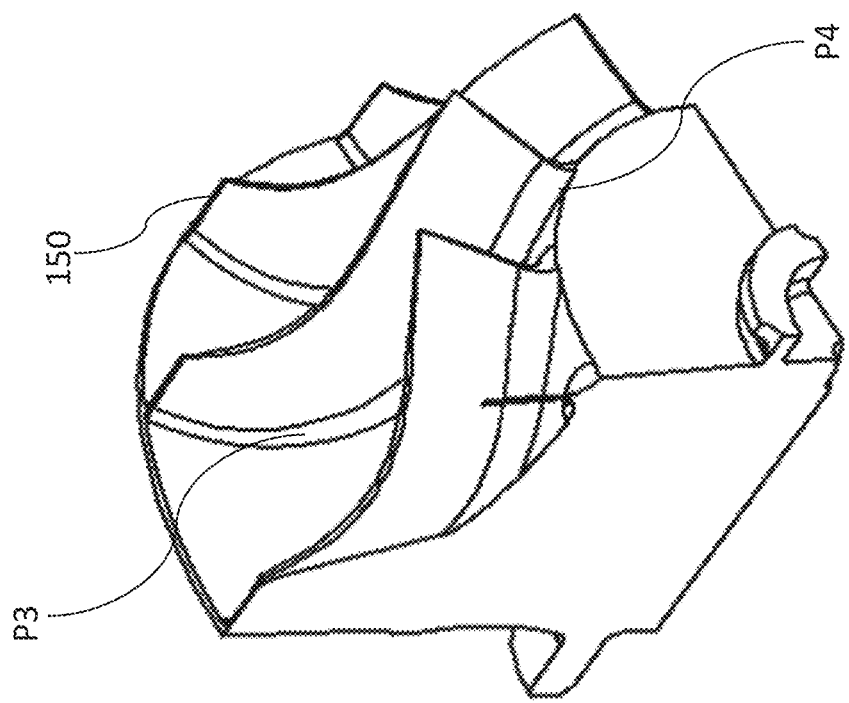
FIGS. 2(a) and 2(b): Exemplary perspective drawings showing critical points on a rotor disc and a rotor blade, respectively.
Figure 2A:
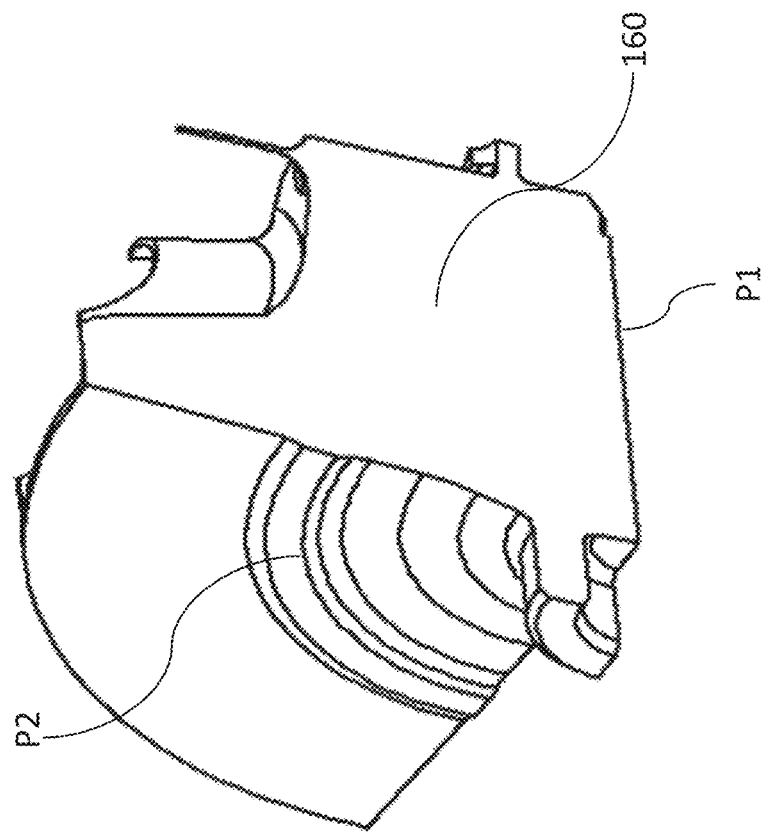

FIG. 1 is an exemplary cross-sectional drawing of a bleed flow path for cooling a high temperature radial turbine according to the principles of invention. The bleed flow path 110 is indicated by a solid line with arrows. The bleed fluid (e.g. air) enters at a bleed flow inlet 110A from a compressor outlet 100, flows along exterior surfaces of rotor blade 150 and rotor disc 160, and then exits at bleed flow exit 110B into a recuperator heat exchanger 105. Region 120 is a main airflow exit region from the turbine rotors, region 130 is a trapped air flow region, inside a static cone, and inlet 140 is the main flow inlet to rotor blade 150. FIGS. 2(a) and 2(b) are exemplary perspective drawings showing the locations of points P1 through P4, at which temperature and/or equivalent (von Mises) stress may reach critical values. Points P1 and P2 in FIG. 2(a) are on the rotor disc 160, and points P3 and P4 in FIG. 2(b) are on the root of rotor blade 150.

A bleed fraction is defined as the mass flow rate of the bleed flow path 110 divided by the total mass flow rate at the exit of the compressor outlet. Temperatures and equivalent stresses have been determined at points P1 through P4 for various simulation scenarios corresponding to different values of the bleed fraction.

The bleed flow temperature and velocity fields are calculated using computational fluid dynamics (CPD) software (e.g. Fluent version 6.3), which is available, for example, from ANSYS Corporation. See websitewww.ansys.com/products/fluids/ansys-fluent, the contents of which are attached hereto as Appendix A. The temperature and stress fields in the turbine metal parts are calculated using finite element analysis (FEA) software (e.g. ANSYS Mechanical Enterprise) which is available, for example, from ANSYS Corporation. See website www.ansys.com/products/structures/ansys-mechanical-enterprise, the contents of which are attached hereto as Appendix B.

The calculated results for a bleed fraction of 3% are summarized in the table below.

TABLE 1

Calculated Temperature and Stress Results
(Bleed Fraction = 3%)

| Point | Location | Temperature (° K.) | Stress (MPa) |
|---|---|---|---|
| P1 | on rotor disc | 735 | 612 |
| P2 | on rotor disc | 660 | 746 |
| P3 | on rotor blade | 1000 | 574 |
| P4 | on rotor blade | 815 | 670 |

In Table 1, point P3 on the root of the rotor blade is seen to have the highest temperature. When the bleed fraction is reduced from 3% to zero (i.e. no bleed flow at all), the temperature calculated at point P3 is found to increase from 1000° K to 1100° K.

Figure 3:
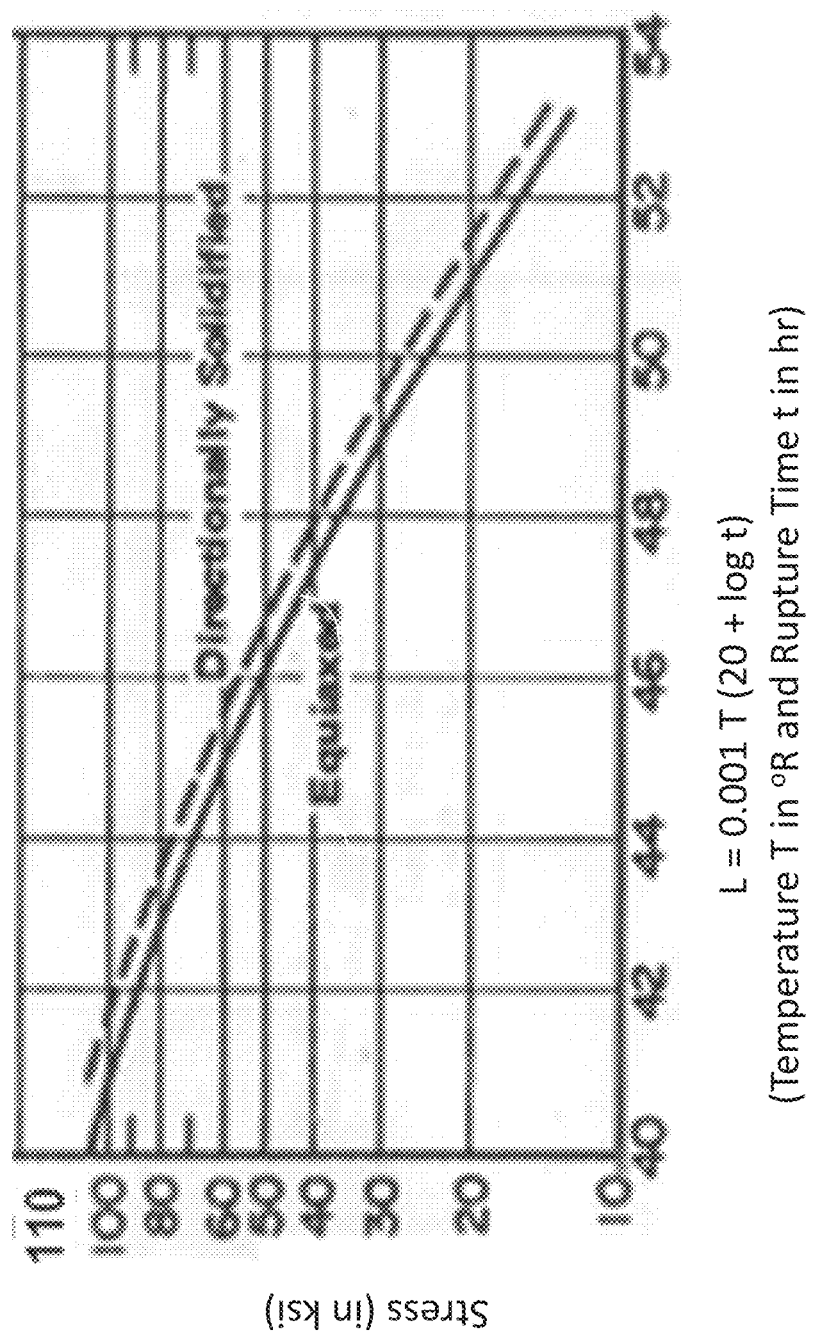
FIG. 3: An exemplary graph of von Mises stress versus the Larson-Miller parameter (L) for creep rupture of an exemplary metal alloy.

Rotor lifetime depends strongly on material composition and temperature. FIG. 3 shows an exemplary graph of von Mises stress versus the Larson-Miller parameter (L) for creep rupture of a metal alloy, known as Mar-M-247, which consists primarily of Nickel, Cobalt, and Tungsten. The parameter on the horizontal axis is the Larson-Miller parameter, $L=0.001 \times T \times [20+\log_{10}(t)]$, where T denotes temperature in degrees Rankine (° R), and (t) denotes the operational lifetime in hours. The value on the vertical axis is the equivalent (von Mises) stress, in units of kilo-pound force per square inch (ksi).

The operational lifetime (t) of the rotor is calculated by the equation:

$$\log_{10}(t)=1000 \, L/T(° R)-20 \quad \text{(eqn. 1)}$$

where the Larson-Miller parameter, L, is determined from the calculated stress level at point P3. According to Table 1, the stress at P3 is equal to 574 MPa, which is approximately equal to 83 ksi (using the conversion 1 ksi=6.895 MPa). From FIG. 3, the corresponding value of L is approximately equal to 43. The following table shows the operational lifetime (t) in hours for bleed fractions of 0% and 3%.

TABLE 2

Operational Lifetime
(L = 43)

| Bleed Fraction | Temperature (° K.) | (° R) | $\log_{10}(t)$ | Operational Lifetime, t (hrs) |
|---|---|---|---|---|
| 0% | 1100 | 1980 | 1.717 | 52 |
| 3% | 1000 | 1800 | 3.889 | 7743 |

According to Table 2, the cooling provided by a bleed fraction of just 3% increases the rotor lifetime from 52 hours to 7743 hours. Note also that the energy of the bleed flow is not lost, insofar as the bleed air is heated by the hot rotors and then mixed with the main air flow into the turbine, so that it too contributes to the total turbine energy efficiency.

Figure 4:
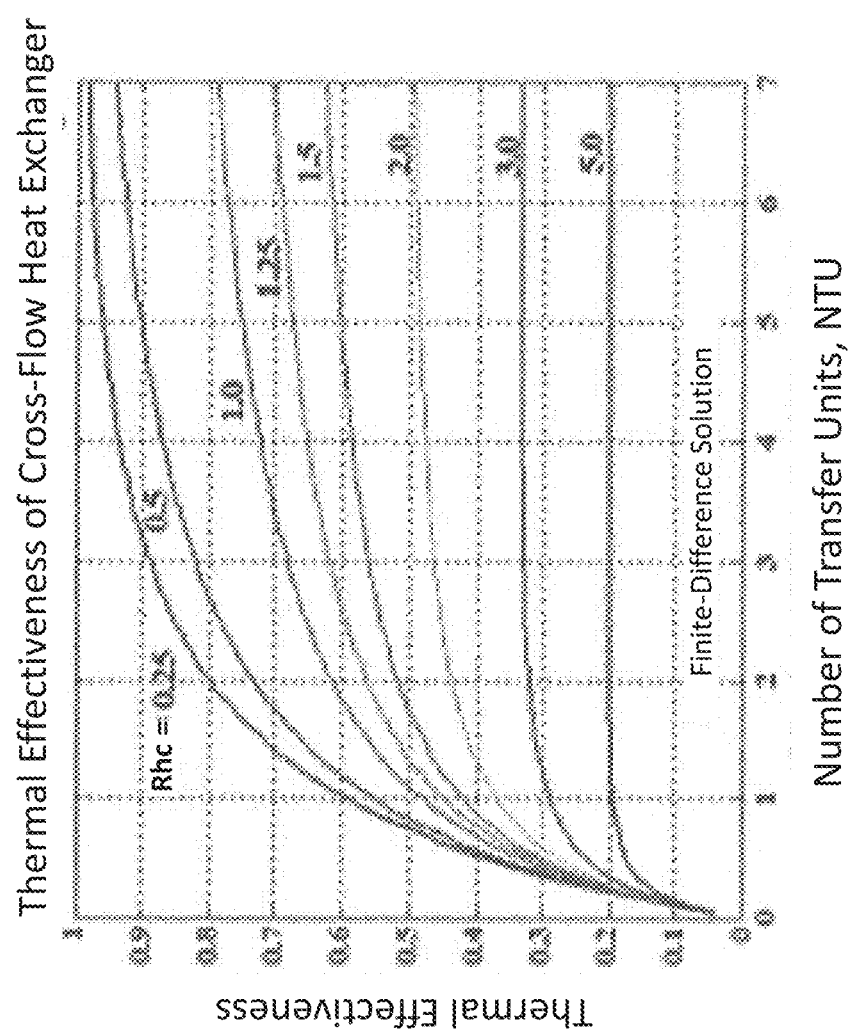
FIG. 4: An exemplary graph showing the thermal effectiveness of a recuperator cross-flow heat exchanger.

A side benefit of the bleed flow is an increase in recuperation thermal effectivity, in the case of a recuperated gas turbine. FIG. 4 shows the thermal effectivity (Eff) of an exemplary cross-flow recuperator heat exchanger in terms of the number of transfer units (NTU) and the hot-to-cold flow ratio (Rhc) in the heat exchanger. For a fixed value of NTU, Eff increases with decreasing Rhc. Since the bleed flow reduces the mass flow rate of fluid flowing into the heat exchanger by an amount equal to the mass flow rate of the bleed flow path 110, the value of Rhc is reduced. As seen in FIG. 4, reducing Rhc has the effect of increasing Eff and, with it, the overall energy efficiency of the turbine engine. For example, for a typical recuperator and bleed flow design, it has been found that Eff increases from 83% to 88% when the bleed fraction increases from 0% to 10%.

Although the invention has been described in conjunction with specific embodiments, it is evident that many alternatives, modifications, and variations will be apparent to those skilled in the art. Accordingly, the invention is intended to embrace all such alternatives, modifications, and variations that fall within the spirit and broad scope of this disclosure.

The invention claimed is:

1. A method for cooling hot components of a high-temperature radial gas turbine engine comprising:
   providing a radial gas turbine engine comprising a compressor outlet and at least one rotor comprising a rotor disc and a rotor blade and a recuperator heat exchanger; and
   providing a bleed flow path in which a fluid passes from the compressor outlet and flows along surfaces of the rotor disc and rotor blade;
   wherein a ratio of a mass flow in the bleed flow path to a mass flow in the compressor outlet is equal to a bleed fraction which is greater than or equal to zero and less than or equal to one;
   a thermal effectiveness of the recuperator heat exchanger increases in proportion to the bleed fraction; and
   an increase in the bleed fraction causes an increase in a recuperator outlet temperature and substantially no change in a turbine inlet temperature.

2. The method of claim 1 wherein a root of the rotor blade is attached to the rotor disc.

3. The method of claim 1 wherein the mass flow in the bleed flow path cools the rotor disc and the rotor blade, and is mixed with a main mass flow along a surface of the rotor blade.

4. The method of claim 1 wherein an operational lifetime of the radial gas turbine engine increases in proportion to the bleed fraction, for a fixed engine thermal efficiency.

5. The method of claim 1 wherein a thermal efficiency of the radial gas turbine engine increases in proportion to the bleed fraction, for a fixed engine operational lifetime.

6. The method of claim 1 wherein the bleed fraction is greater than or equal to 3 per cent.

\* \* \* \* \*